US012574490B1

(12) United States Patent
Jiang

(10) Patent No.: US 12,574,490 B1
(45) Date of Patent: Mar. 10, 2026

(54) METHOD FOR TRANSFORMING SPATIAL VIDEO FILE INTO GLASSES-FREE SBS STEREOSCOPIC IMAGE FORMAT

(71) Applicant: He Yuan Jiang, New Taipei City (TW)

(72) Inventor: He Yuan Jiang, New Taipei City (TW)

( * ) Notice: Subject to any disclaimer, the term of this patent is extended or adjusted under 35 U.S.C. 154(b) by 0 days.

(21) Appl. No.: 18/938,301

(22) Filed: Nov. 6, 2024

(51) Int. Cl.
| | |
|---|---|
| *H04N 13/305* | (2018.01) |
| *G06T 7/194* | (2017.01) |
| *G06V 10/764* | (2022.01) |
| *H04N 13/156* | (2018.01) |

(52) U.S. Cl.
CPC ........... *H04N 13/305* (2018.05); *G06T 7/194* (2017.01); *G06V 10/764* (2022.01); *H04N 13/156* (2018.05)

(58) Field of Classification Search
CPC ..... H04N 13/305; H04N 13/156; G06T 7/194
USPC ........................................................ 348/51
See application file for complete search history.

(56) References Cited

U.S. PATENT DOCUMENTS

| | | | |
|---|---|---|---|
| 2010/0128113 A1* | 5/2010 | Hsieh | G02B 30/27 |
| | | | 348/E13.001 |
| 2013/0033586 A1* | 2/2013 | Hulyalkar | H04N 13/106 |
| | | | 348/51 |

* cited by examiner

*Primary Examiner* — Jeffery A Williams
(74) *Attorney, Agent, or Firm* — Bradley J. Thorson; DeWitt LLP

(57) ABSTRACT

A method for transforming a spatial video file into a glasses-free SBS (side-by-side) stereoscopic image format is disclosed. A spatial video file has a first image and a second image. The first image and the second image are embedded with position information of X-axis, Y-axis and Z-axis corresponding to the respective images. Through an AI (artificial intelligence) device to separately focus the foreground and background of each image according to the position information of the first image and the second image. After the first image and the second image are clear, the first image and the second image are synthesized into an SBS stereoscopic image format that is mapped with a glasses-free stereoscopic imaging film.

6 Claims, 1 Drawing Sheet

An AI device is used to receive an Apple's spatial video file.

The AI device has a built-in AI image model. The AI device performs image analysis and feature classification for a first image and a second image in the input Apple's spatial video file based on the AI image model.

The AI device simultaneously adjusts image clarity by separately focusing on the foreground and background of each image based on the position information of the first image and the second image, enabling the first image and the second image to be clear.

The first image and the second image after being adjusted for image clarity by the AI device are synthesized into an SBS stereoscopic image format that is mapped with a glasses-free stereoscopic imaging film.

An AI device is used to receive an Apple's spatial video file.

The AI device has a built-in AI image model. The AI device performs image analysis and feature classification for a first image and a second image in the input Apple's spatial video file based on the AI image model.

The AI device simultaneously adjusts image clarity by separately focusing on the foreground and background of each image based on the position information of the first image and the second image, enabling the first image and the second image to be clear.

The first image and the second image after being adjusted for image clarity by the AI device are synthesized into an SBS stereoscopic image format that is mapped with a glasses-free stereoscopic imaging film.

METHOD FOR TRANSFORMING SPATIAL VIDEO FILE INTO GLASSES-FREE SBS STEREOSCOPIC IMAGE FORMAT

FIELD OF THE INVENTION

The present invention relates to the field of glasses-free 3D image technology, and more particularly, to a method for transforming an Apple's spatial video file into a glasses-free SBS (side-by-side) stereoscopic image format.

BACKGROUND OF THE INVENTION

In these days, stereoscopic display devices present a three-dimensional visual effect through a certain digital processing. Three-dimensional vision refers to the ability of humans to view with both eyes and perceive the distance and shape of objects (binocular vision). The images from both eyes are superimposed and processed into a single image, which provides the illusion of 3-dimensional (3D) images and thus depth. Therefore, a stereoscopic display device needs to separate the signals for the left and right eyes, which are independently received by the viewer's left and right eyes, allowing them to perceive the three-dimensional vision of objects.

Stereoscopic display devices on the market are classified into head-mounted displays and glasses-free displays. Head-mounted displays have a long history of development. Early 3D movies used anaglyph glasses to present a three-dimensional visual effect. However, anaglyph glasses present a three-dimensional visual effect only on grayscale or monotonous color backgrounds. Nowadays, most people use polarized glasses which have polarized lenses with different polarization angles on the left and right. The film itself uses two projection devices to project light in different polarization directions on different columns of pixels, so that the left and right eyes only see the vertical or horizontal polarized light respectively, thus presenting a three-dimensional visual effect. In addition, the head-mounted display uses a small screen in front of each eye to display different images independently, thereby achieving an excellent three-dimensional visual effect.

In recent years, products using LCD monitors as real-time information output interfaces have been constantly updated, such as the Spatial Video recording function to be released in September 2023 by Apple Inc. in the United States. Apple's spatial videos are recorded through the main and ultra-wide cameras of Apple's video recording devices (such as iPhone or Apple Vision Pro). The field of view from the ultra-wide camera is scaled to match that of the main camera, and an RGB camera and laser is used to collect the position information of a photographed object. Through its internal computational program, the position information of the X-axis, Y-axis and Z-axis of the photographed object is calculated. Then, the content is saved into a single video file, allowing the recording of a spatial video. However, in order to view a spatial video captured by an iPhone, it is necessary to use the Apple Vision Pro, a head-mounted display that is also sold by Apple Inc., to present a three-dimensional visual effect. However, its exclusive head-mounted display is expensive and not affordable for ordinary consumers. Besides, the large size and heavy weight of the head-mounted display also lead to the disadvantage that users may not be able to use them for a long period of time due to wearer's discomfort.

On the other hand, glasses-free displays present a three-dimensional visual effect without the need for additional glasses. The basic principle is to use blocking, refraction and the like to guide part of the light, so that both eyes of the user see two images with parallax information, thus creating a three-dimensional visual effect. For example, the image from the left eye and the image from the right eye are arranged side by side to form an SBS stereoscopic image format in advance, in cooperation with a glasses-free stereoscopic imaging film that is a lenticular lens grating attached to a glasses-free 3D screen. Through the beam-splitting effect of a cylindrical lens, two images with parallax information are projected to the left and right eyes of the viewer respectively. That is, the left eye receives the light from the pixel viewed by the left eye and the right eye receives the light from the pixel viewed by the right eye to form images with parallax on the retinas of the left and right eyes, respectively. The brain determines the distance of objects based on the angle of parallax and establishes the relative distance of each object to create a three-dimensional visual effect.

However, for the glasses-free stereoscopic display to acquire images, it is necessary to use at least two cameras for capturing images with parallax. The iPhone's spatial video is in a 3D format using two cameras at a fixed interpupillary distance. It is easy for the captured image to be out of focus and blurred because the object is close to one of the cameras of the cell phone. However, spatial videos captured by iPhone do not have to be very precise in terms of focus because when the left and right images captured by the two cameras are played through Apple Vision Pro, a head-mounted display with two screens, the human brain automatically focuses on the images viewed by both eyes. However, on a glasses-free 3D screen, when the human eye focuses on the foreground, the background view will inevitably be out of focus and blurred, and vice versa. Therefore, it is not suitable to transform the spatial video captured by iPhone directly into a glasses-free SBS stereoscopic format.

SUMMARY OF THE INVENTION

The primary object of the present invention is to provide a method for transforming a spatial video file into a glasses-free SBS (side-by-side) stereoscopic image format. By using an AI device to ensure clear 3D images, users can view stereoscopic images directly on a display screen through a glasses-free stereoscopic imaging film.

In order to achieve the foregoing objects, the present invention a method for transforming a spatial video file into a glasses-free SBS (side-by-side) stereoscopic image format. A spatial video file has a first image and a second image. The first image and the second image are embedded with position information of X-axis, Y-axis and Z-axis corresponding to the respective images. Through an AI (artificial intelligence) device to separately focus the foreground and background of each image according to the position information of the first image and the second image. After the first image and the second image are clear, the first image and the second image are synthesized into an SBS stereoscopic image format that is mapped with a glasses-free stereoscopic imaging film.

Furthermore, the AI device is an electronic device with built-in artificial intelligence programs and algorithms. The AI device is configured for receiving the spatial video file. The AI device has an AI algorithm module and a database. The AI algorithm module analyzes information in the database. An AI image model is trained/learned and built by inputting 2D image data into the database. The AI algorithm module performs image analysis and feature classification for the first image and the second image in the input spatial video file based on the AI image model.

Preferably, the AI algorithm module simultaneously adjusts image clarity by separately focusing on the foreground and background of each image based on the position information of the first image and the second image. After the first image and the second image are clear, the first image and the second image after being adjusted for image clarity by the AI algorithm module are synthesized into the SBS stereoscopic image format that is mapped with the glasses-free stereoscopic imaging film.

Preferably, the AI algorithm module automatically generates the corresponding second image based on the first image according to the AI image model. Through the AI algorithm module, the first image and the automatically generated second image are synthesized into the SBS stereoscopic image format that is mapped with the glasses-free stereoscopic imaging film.

Preferably, the glasses-free stereoscopic imaging film is a lenticular optical film. The glasses-free stereoscopic imaging film is formed with convex lenses that are connected to each other in sequence. The glasses-free stereoscopic imaging film is attached to a surface of a display. The transformed SBS stereoscopic image format is played through a multimedia playback program (App) to map each pixel of left and right images to a corresponding position on the display. The glasses-free stereoscopic imaging film uses the principle of refraction to allow the first image and the second image with parallax information to be projected to the left and right eyes of a viewer respectively. The viewer's brain processes the acquired parallax information, allowing a 3D visual effect to be presented in a glasses-free manner.

For further explaining the objects and advantages of the present invention, the following description, in conjunction with the accompanying drawings and preferred embodiments, is set forth as below.

BRIEF DESCRIPTION OF THE DRAWINGS

The sole FIGURE is a flow chart of the present invention.

DETAILED DESCRIPTION OF THE PREFERRED EMBODIMENTS

As shown in the sole FIGURE, the present invention discloses a method for transforming an Apple's spatial video file into a glasses-free SBS (side-by-side) stereoscopic image format. By using an AI (artificial intelligence) device to analyze and edit an Apple's spatial video file released by Apple Inc., the file can be synthesized and transformed into an SBS stereoscopic image format that is mapped with a glasses-free stereoscopic imaging film.

Apple's spatial video files are recorded through the main and ultra-wide cameras of Apple's video recording devices (such as iPhone or Apple Vision Pro). The field of view from the ultra-wide camera is scaled to match that of the main camera, in cooperation with an RGB camera and laser to collect the position information of a photographed object. The position information of the X-axis, Y-axis, and Z-axis of the photographed object is calculated through its internal computational program. Then, the content is saved into a single video file, allowing the recording of a spatial video file containing a first image for the left eye and a second image for the right eye. The first image and the second image are embedded with the position information of X-axis, Y-axis and Z-axis corresponding to the images.

The AI device is an electronic device with built-in artificial intelligence programs and algorithms. The AI device is used to receive Apple's spatial video files. The AI device has an AI algorithm module and a database. The AI algorithm module analyzes the information in the database. An AI image model is trained/learned and built by inputting a large amount of 2D image data into the database. The AI algorithm module performs image analysis and feature classification for the first image and the second image in the input spatial video file based on the AI image model. The AI algorithm module simultaneously adjusts image clarity by separately focusing on the foreground and background of each image based on the position information of the first image and the second image. After the first image and the second image are clear, the first image and the second image after being adjusted for image clarity by the AI algorithm module will be synthesized and transformed into an SBS stereoscopic image format that is mapped with a glasses-free stereoscopic imaging film. That is to say, the present invention makes it easier and faster to obtain spatial-angular images from the left and right eyes through the AI image model built by the AI device through big data, instead of the traditional ways, such as the use of light and shadow, depth map, and the like, to build a 3D model.

When a sufficient amount of 2D image data is input into the database, the AI algorithm module automatically generates the corresponding second image (for example, the image from the right eye) based on the first image (for example, the image from the left eye) according to the AI image model. Then, through the AI algorithm module, the first image and the automatically generated second image are synthesized and transformed into the SBS stereoscopic image format that is mapped with the glasses-free stereoscopic imaging film.

In practical applications, the glasses-free stereoscopic imaging film is a lenticular optical film. The glasses-free stereoscopic imaging film is formed with convex lenses that are connected to each other in sequence. The glasses-free stereoscopic imaging film is attached to a surface of a display, such as a mobile phone screen, a computer screen, a TV screen, a digital photo frame screen or an e-reader screen. The transformed SBS stereoscopic image format is played through a multimedia playback program (App) to map each pixel of the left and right images to a corresponding position on the display. The glasses-free stereoscopic imaging film uses the principle of refraction to allow the first image and the second image with parallax information to be projected to the left and right eyes of the viewer respectively. Then, the viewer's brain processes the acquired parallax information, allowing the 3D visual effect to be presented in a glasses-free manner.

As can be seen from the above description, the present invention allows a user to transform a spatial video file captured by an iPhone into an SBS stereoscopic image format that can be played directly on a display to which a glasses-free stereoscopic imaging film is attached. There is no need to purchase the expensive Apple Vision Pro. The 3D visual effect can be presented on a regular display in a glasses-free manner. Besides, the present invention also effectively solves the problem of out-of-focus and blurred images when taking pictures with the main and ultra-wide cameras of iPhone. The present invention is highly practical.

What is claimed is:

1. A method for transforming a spatial video file into a glasses-free SBS (side-by-side) stereoscopic image format, the method performed by an artificial intelligence (AI) device, the AI device comprising a processor and a nontransitory computer-readable medium storing instructions that, when executed by the processor, cause the AI device to perform steps comprising:

receiving a spatial video file having a first image and a second image, wherein the first image and the second image are embedded with position information of an X-axis, a Y-axis, and a Z-axis corresponding to the respective images;

processing the first image and the second image by separately focusing on a foreground and a background of each image based on the position information to produce a processed first image and a processed second image; and synthesizing the processed first image and the processed second image into an SBS stereoscopic image format that is configured to be mapped with mapped with a glasses-free stereoscopic imaging film.

2. The method as claimed in claim 1, wherein the AI device is an electronic device with built-in artificial intelligence programs and algorithms, the AI device is configured for receiving the spatial video file, the AI device has an AI algorithm module and a database, the AI algorithm module analyzes information in the database, an AI image model is trained/learned and built by inputting 2D image data into the database, and the AI algorithm module performs image analysis and feature classification for the first image and the second image in the input spatial video file based on the AI image model.

3. The method as claimed in claim 2, wherein the AI algorithm module simultaneously adjusts image clarity by separately focusing on the foreground and background of each image based on the position information of the first image and the second image, after the first image and the second image are clear, and the first image and the second image after being adjusted for image clarity by the AI algorithm module are synthesized into the SBS stereoscopic image format that is mapped with the glasses-free stereoscopic imaging film.

4. The method as claimed in claim 2, wherein the AI algorithm module automatically generates the corresponding second image based on the first image according to the AI image model, through the AI algorithm module, and the first image and the automatically generated second image are synthesized into the SBS stereoscopic image format that is mapped with the glasses-free stereoscopic imaging film.

5. The method as claimed in claim 1, wherein the glasses-free stereoscopic imaging film is a lenticular optical film, the glasses-free stereoscopic imaging film is formed with convex lenses that are connected to each other in sequence, the glasses-free stereoscopic imaging film is attached to a surface of a display, the transformed SBS stereoscopic image format is played through a multimedia playback program (App) to map each pixel of left and right images to a corresponding position on the display, the glasses-free stereoscopic imaging film uses the principle of refraction to allow the first image and the second image with parallax information to be projected to the left and right eyes of a viewer respectively, and the viewer's brain processes the acquired parallax information, allowing a 3D visual effect to be presented in a glasses-free manner.

6. The method as claimed in claim 5, wherein the display is one of a mobile phone screen, a computer screen, a TV screen, a digital photo frame screen and an e-reader screen.

\* \* \* \* \*